United States Patent
Trouilhet et al.

(12)

(10) Patent No.: US 6,906,140 B2
(45) Date of Patent: Jun. 14, 2005

(54) PROPYLENE BASED SEALANT COMPOSITIONS AND APPLICATIONS

(75) Inventors: Yves M. Trouilhet, Vesenaz (FR); Bernard Rioux, Puteaux (FR); Jacques Andre, Annemasse (FR); Sebastian Landeck, Berlin (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 77 days.

(21) Appl. No.: 10/428,230

(22) Filed: May 2, 2003

(65) Prior Publication Data

US 2004/0006180 A1 Jan. 8, 2004

Related U.S. Application Data

(60) Provisional application No. 60/378,310, filed on May 6, 2002.

(51) Int. Cl.[7] .............................. C08F 8/00; C08L 23/00; C08L 23/04; C08L 33/04; C08L 35/02
(52) U.S. Cl. ........................ 525/191; 525/222; 525/240; 428/516; 428/520
(58) Field of Search ................................ 525/191, 222, 525/240; 428/516, 520

(56) References Cited

U.S. PATENT DOCUMENTS

| 4,588,777 | A | | 5/1986 | Hotta |
| 5,272,210 | A | | 12/1993 | Galante |
| 5,468,259 | A | * | 11/1995 | Sheth et al. .................... 8/497 |
| 6,433,088 | B1 | * | 8/2002 | Saraf ........................... 525/191 |
| 6,831,131 | B2 | | 12/2004 | Bouilloux et al. |

FOREIGN PATENT DOCUMENTS

WO    WO 94/12569    6/1994

OTHER PUBLICATIONS

PCT International Search Report, International application No. PCT/US 03/14208, dated Jul. 30, 2003.

* cited by examiner

Primary Examiner—Nathan M. Nutter

(57) ABSTRACT

The present invention relates to a sealant composition comprising i) at least a copolymer of propylene and α-olefins, and ii) at least a copolymer of ethylene and alkyl acrylate, wherein the alkyl acrylate is present in an amount ranging from about 1 to less than 9 weight percent, relative to the weight of the sealant composition. It also relates to a multilayer film or a packaging comprising a sealant layer comprising such a composition.

8 Claims, No Drawings

PROPYLENE BASED SEALANT COMPOSITIONS AND APPLICATIONS

This application claims the benefit of U.S. Provisional Application No. 60/378,310, filed May 6, 2002, which is incorporated by reference herein for all purposes as if fully set forth.

FIELD OF INVENTION

The present invention relates to a sealant composition comprising a copolymer of ethylene and alkyl acrylate and a copolymer of propylene and α-olefins. It also relates to multilayer films and packagings having a sealant layer comprising such a composition.

BACKGROUND OF THE INVENTION

In the packaging industry, it is conventional that a product is packed in a plastic film or a rigid plastic package which is then heat sealed. The film forming the package usually comprises a substrate layer and a sealant layer. The sealant layer is the topmost layer of the film and is in direct contact with the packed item. The seal must possess a mechanical resistance sufficient to maintain the tight-seal properties during storage and transport. This seal strength is usually measured in Newton per 15 millimeter (N/15 mm) and corresponds to the necessary force to open a sealed film of 15 mm width. Usually, the seal strength increases with the sealing temperature up to a temperature above which the seal can not be opened without destroying the film.

However, in industry, it is desired that these packaging films be suitable for high speed machine packaging. In this view, it is useful to provide a sealant layer that can be sealed at relatively low temperatures in order to allow for higher packaging line speeds of packaging machines. The minimal temperature allowing for sufficient seal strength in a certain application (this sufficient strength can be set at 1 N/15 mm for instance) is called the seal initiation temperature (SIT). It would therefore be useful to have sealant layers showing a relatively low heat seal initiation temperature.

Also, it is observed that after the heat sealing stage, the seal strength of the packaging increases with cooling. Usually, a great percentage of the final seal strength is obtained after several milliseconds. However, because of the high speed machines used on packaging lines, it is necessary to reach an appropriate seal strength right after the heat sealing stage so that the packaging does not delaminate on the line before it is cold. This property is called the hot tack. It would therefore be useful to have sealant layers showing a good hot tack.

U.S. Pat. No. 5,272,210 describes a film made of a mixture of a propylene-ethylene copolymer and an ethylene-alkyl acrylate copolymer, with a minimum amount of alkyl acrylate in the mixture, showing good RF sealing properties.

However, there is still a need for sealant layers for packaging films that would have a relatively low heat seal initiation temperature, a good heat seal strength, and a good hot tack.

SUMMARY OF THE INVENTION

Now, it has been surprisingly found that the combination of two specific types of polymers with a specific amount of one specific monomer lead to a sealant composition showing excellent properties as regards heat seal strength, seal initiation temperature and hot tack.

A first aspect of the invention is a sealant composition comprising i) at least a copolymer of propylene and α-olefins, and ii) at least a copolymer of ethylene and alkyl acrylate, wherein the alkyl acrylate is present in an amount ranging from about 1 to less than 9 weight percent, relative to the weight of the sealant composition.

Another aspect of the invention is a multilayer film comprising at least one substrate layer and at least one sealant layer comprising the sealant composition above.

Another aspect of the invention is a packaging comprising the sealant composition or the film above.

The sealant composition of the invention has a significantly reduced heat seal initiation temperature. The film of the invention shows a low seal initiation temperature, which means that packages made of this film can be sealed at lower temperatures than before. This is particularly important in industrial processes where each operation must be rapid. By lowering the seal initiation temperature, the cycle time on packing lines can be improved. Lowering the seal initiation temperature is also very important when packing heat-sensitive products like chocolates.

With the sealant composition of this invention, it is possible to make films showing a good seal strength. In particular, the films show a seal strength of more than 5 N/15 mm measured as described in the examples below.

The films of the invention also show a good hot tack, allowing for high speed machine packaging.

The films of the invention can find use in food packagings like cereals, chocolates, meat, soup packagings.

DETAILED DESCRIPTION OF THE INVENTION

The sealant composition of the invention comprises at least a copolymer of propylene and α-olefins. By copolymer of propylene and α-olefins is meant herein a copolymer of propylene and one monomer selected from α-olefins, or a terpolymer of propylene and two different monomers selected from α-olefins. Suitable α-olefins include ethylene and butene.

The copolymer of propylene and α-olefins preferably shows a melting point less than 155° C. measured by DSC (differential scanning calorimeter) according to ASTM D 3418. Preferred copolymers include random copolymers of propylene and ethylene and terpolymers of propylene, ethylene and butene.

Such copolymers are known to the man skilled in the art. Suitable random copolymers of propylene and ethylene for use in the present invention are the products commercially available under the trademark "Moplen RP 210 M" from Basell or "RE 239 CF" from Borealis. Suitable terpolymers of ethylene, propylene and butene are the products commercially available under the trademark "Adsyl 5C 39F" from Basell.

The copolymer of propylene and α-olefins is preferably present in the sealant composition in an amount from about 60% to about 99% by weight, relative to the weight of the sealant composition.

The sealant composition also comprises at least a copolymer of ethylene and alkyl acrylate.

The copolymer of ethylene and alkyl acrylate useful in the present invention preferably comprises from about 1 to about 40%, more preferably from about 10 to 30%, by weight of monomer of alkyl acrylate, relative to the weight of the copolymer. Alkyl acrylate suitable for the present invention include methyl acrylate, ethyl acrylate and butyl acrylate. Preferred alkyl acrylates are methyl acrylate and butyl acrylate.

Such products are well known to the man skilled in the art. Suitable copolymers of ethylene and alkyl acrylate for use in the present invention are the products commercially available under the trademark Elvaloy® AC from E.I. du Pont de Nemours and Company, Del.

The copolymer of ethylene and alkyl acrylate is present in the sealant composition in an amount so that the monomer alkyl acrylate is present in the sealant composition in an amount ranging from about 1 to less than 9% by weight, relative to the weight of the sealant composition; more preferably, the amount of monomer alkyl acrylate ranges from about 1 to about 6%. It has been observed that when the amount of monomer alkyl acrylate is 9% or above by weight, relative to the total weight of the sealant composition, then the seal strength of the composition dramatically drops to a value not suitable for a tight packaging.

The sealant composition may comprise additives including slip agents, antiblock agents and/or mixtures thereof. Such additives may be present in the sealant composition in an amount ranging from about 0.1% to about 1% by weight, relative to the total weight of the sealant layer.

The sealant composition can be prepared by any extrusion process, for instance in the following manner: a blend is prepared by simply mixing the components under the form of pellets, as a salt and pepper blend. This blend is then compounded in an extruder and granulated. Alternatively, the pellet blend can also be fed in a film converting extruder without compounding.

The sealant composition of the invention can be used as a sealant layer of a multilayer film. The sealant layer has usually a thickness ranging from about 1 to about 100 microns, preferably from about 2 to about 10 microns. Such a multilayer film comprises at least a substrate layer.

In a preferred embodiment of the invention, the substrate layer comprises at least one propylene based polymer. This polymer may be a homopolymer or a copolymer of propylene with one or more comonomers, as well as mixtures thereof.

In a preferred embodiment of the invention the propylene based polymer is a homopolymer of propylene.

Such polymers are known to the man skilled in the art. Suitable propylene based polymers for use in the present invention are the products commercially available under the trademark "Moplen X 30S" from Basell.

The substrate layer may comprise the usual additives including stabilizers, antioxidants, anti-static agents, dyes or pigments, fillers, processing aids, for example release agents, and/or mixtures thereof. These additives may be present in the substrate layer up to an amount less than about 20% by weight, relative to the weight of the substrate layer.

The substrate layer has generally a thickness of about 10 to about 1000 microns, preferably of about 15 to about 35 microns.

The multilayer film of the invention may also comprise additional layers such as tie layers or barrier layers. Suitable tie layers are layers comprising polypropylene based adhesives. Suitable barrier layers are polyamide or ethylene vinyl alcohol based layers.

The multilayer film of the invention may be prepared by cast-film co-extrusion, cast-sheet coextrusion, blown film coextrusion or by lamination. Cast films and blown films may be biaxially oriented.

The sealant composition of the invention may also be used as a sealant layer in a lid packaging. For instance, the sealant layer can be laminated on a biaxially oriented polyester or biaxially oriented polypropylene lid or on an aluminium lid.

The packaging of the invention may be prepared according to the classical methods of preparation of such packagings made from films.

The invention will be further described in the following Examples.

EXAMPLES

Description of Ingredients:

Materials used in the Examples set forth below are as follows, identified by the respective trademarks and trade designations:

PP 1: random copolymer of propylene and ethylene having a melting point of 148° C. measured according to ASTM D 3418, commercially available from Basell under the tradename Moplen® RP 210 M PP 2: random copolymer of propylene and ethylene having a melting point of 140° C. measured according to ASTM D 3418, commercially available from Borealis under the tradename RE 239 CF PP 3: terpolymer of propylene, ethylene and butene having a melting point of 139° C. measured according to ASTM D 3418, commercially available from Basell under the tradename Adsyll® 5C 39 F EBA 1: copolymer of ethylene and 27% butyl acrylate commercially available from E.I. du Pont de Nemours and Company, under the tradename Elvaloy® AC 3427 and having a melt index of 4

EBA 2: copolymer of ethylene and 17% butyl acrylate commercially available from E.I. du Pont de Nemours and Company, under the tradename Elvaloy® AC 3717 and having a melt index of 7

EBA 3: copolymer of ethylene and 17% butyl acrylate commercially available from E.I. du Pont de Nemours and Company, under the tradename Elvaloy® AC 3217 and having a melt index of 2

EMA 1: copolymer of ethylene and 20% methyl acrylate commercially available from E.I. du Pont de Nemours and Company, under the tradename Elvaloy® AC 1820 and having a melt index of 8

EMA 2: copolymer of ethylene and 24% methyl acrylate commercially available from E.I. du Pont de Nemours and Company, under the tradename Elvaloy® AC 1224 and having a melt index of 2

The Melt Index (MI) of the above EBA and EMA compounds is measured according to ASTM D 1238 @ 190° C./2.16 kg.

The following compositions (1 to 23 as listed in Tables I and II below) for the sealant layer were prepared. All amounts are given in parts by weight relative to the total weight of the sealant layer.

TABLE I

| Comp. | PP 1 | PP 2 | PP 3 | EBA 1 | EBA 2 | EBA 3 | % of BA |
|---|---|---|---|---|---|---|---|
| 1 | 100 | | | | | | — |
| 2 | | 100 | | | | | — |
| 3 | 90 | | | 10 | | | 2.7 |
| 4 | 80 | | | 20 | | | 5.4 |
| 5 | 70 | | | 30 | | | 8.1 |
| 6 | | 90 | | 10 | | | 2.7 |
| 7 | | 80 | | 20 | | | 5.4 |
| 8 | | 70 | | 30 | | | 8.1 |
| 9 | | | 90 | 10 | | | 2.7 |
| 10 | | | 80 | 20 | | | 5.4 |

TABLE I-continued

| Comp. | PP 1 | PP 2 | PP 3 | EBA 1 | EBA 2 | EBA 3 | % of BA |
|---|---|---|---|---|---|---|---|
| 11 | | | 70 | 30 | | | 8.1 |
| 12 | | 90 | | | 10 | | 1.7 |
| 13 | | 80 | | | 20 | | 3.4 |
| 14 | | 70 | | | 30 | | 5.1 |
| 15 | 80 | | | | 20 | | 3.4 |
| 16 | | 90 | | | | 10 | 1.7 |
| 17 | | 80 | | | | 20 | 3.4 |
| 18 | | 70 | | | | 30 | 5.1 |
| 19 | | 60 | | 40 | | | 10.8 |

TABLE II

| Comp. | PP 1 | PP 2 | EMA 1 | EMA 2 | % of MA |
|---|---|---|---|---|---|
| 20 | 80 | | 20 | | 4.0 |
| 21 | | 90 | | 10 | 2.4 |
| 22 | | 80 | | 20 | 4.8 |
| 23 | | 70 | | 30 | 7.2 |

Compositions 1 and 2, which do not comprise any copolymer of ethylene and alkyl acrylate, are comparative compositions. Composition 19, which comprises more than 9% of butyl acrylate, is also a comparative composition. Compositions 3–18 and 20–23 are compositions according to the invention.

For each composition above listed, a film of the following structure was prepared:
sealant layer 10 microns/substrate layer 25 microns/sealant layer 10 microns.
in which the sealant layer is made of the composition and the substrate layer is made of 100% of a homopolymer of propylene commercially available from Basell under the tradename Moplen X30S.

Each film was produced by co-extrusion on a cast film pilot line from Davis Standard. The substrate layer was prepared by introducing the homopolymer of propylene Moplen in extruder A (2.5" diameter). The sealant layers were prepared by blending the pellets of the different components in a concrete mixer during about 5 minutes. The so prepared blends were introduced in the hopper of extruder B (4.5" diameter) and extruder C (2.5" extruder). The three extruders were connected to a feed bloc and a T-slot die 800 mm in width. The temperatures in all extruders from feed zone to metering zone were set at 180° C., 200° C., 220° C., 230° C. and 240° C. The connecting pipes, the feed bloc and the die were set at a temperature of 240° C. The melt curtain was cooled down and solidified on a casting roll cooled with water at 12° C. The film was produced at 10 m/min and winded up after slitting the edges.

Preparation of Samples:

The samples were prepared as follows: strips of 15 mm width were cut from the prepared cast films in machine direction. The samples were heat sealed on a Sentinel Heat Sealer Packaging Industry 1671, with an upper heated and a lower flexible bar. Each sample was sealed on itself at a pressure of 2.5 bar and a dwell time of 0.6 seconds (s). To avoid sticking of polymer to the heated bar, a 12 $\mu$ polyester film (commercially available from E.I. du Pont de Nemours and Company under the tradename Mylar®) covered each sample.

Tests:
Heat Seal Strength Test:

Strength of the prepared seals were measured after conditioning at 23° C. and 50% relative humidity for 24 h. The seal strength was measured on a Zwick Z 2.5 Tensile Tester at a pulling speed set to 100 mm/min.

The values presented are given in N/15 mm and are an average of at least three measurements.

Seal Initiation Temperature (SIT):

The seal initiation temperature (SIT) is the temperature for which the measured seal strength is 1 N/15 mm. The SIT measured for the compositions are collected in the following table:

| Film | 1 | 2 | 3 | 4 | 5 | 6 |
|---|---|---|---|---|---|---|
| SIT in ° C. | 141 | 130 | 137 | 130 | 117 | 132 |
| Film | 7 | 8 | 9 | 10 | 11 | 12 |
| SIT in ° C. | 124 | 122 | 126 | 120 | 115 | 131 |
| Film | 13 | 14 | 15 | 16 | 17 | 18 |
| SIT in ° C. | 129 | 122 | 132 | 123 | 125 | 122 |
| Film | 19 | 20 | 21 | 22 | 23 | |
| SIT in ° C. | 112 | 138 | 127 | 121 | 116 | |

Compositions 3–5, 15 and 20 are to be compared to composition 1. Compositions 9–11 are to be compared to composition 2. The seal initiation temperature is significantly reduced by adding a copolymer of ethylene and butyl acrylate or a copolymer of ethylene and methyl acrylate.

Maximal Seal Strength (MSS):

The maximum seal strength (MSS) is the highest measured strength value for a given film in a sealing temperature range up to 160° C. The maximal seal strength (MSS in N/15 mm) measured for the compositions are collected in the following table:

| Film | 1 | 2 | 3 | 4 | 5 | 6 |
|---|---|---|---|---|---|---|
| MSS | 10 | 12 | 10 | 6 | 5 | 6 |
| Film | 7 | 8 | 9 | 10 | 11 | 12 |
| MSS | 10 | 7 | 14 | 14 | 5 | 12 |
| Film | 13 | 14 | 15 | 16 | 17 | 18 |
| MSS | 14 | 6 | 5 | 12 | 10 | 7 |
| Film | 19 | 20 | 21 | 22 | 23 | |
| MSS | 2 | 8 | 12 | 10 | 9 | |

As can be seen from this table, the maximal seal strength of the compositions according to the invention is very good. In any case it is above or equal to 5 N/15 mm. On the contrary, the composition 19, which comprises more than 9% by weight of butyl. acrylate, shows a maximal seal strength value of only 2 N/15 mm. Such a maximal seal strength does not allow to realise a tight packaging. With a maximal seal strength of 2 N/15 mm, the seal may open during transportation.

Hot Tack:

The hot tack was measured for composition 12 and a composition comprising 100% of PP 2 (comparative composition 24), using a DTC Hot Tack Tester Mod. 52 B SN 012 from Packforsk, Sweden. Strips of 15 mm width were cut from the respective films and were introduced into the apparatus. They were sealed using two heated bars at a pressure of 3 bars and with a dwell time of 0.5 s. After 0.2 s from this sealing step, the seal strength of the warm seal was measured on a Zwick Z 2.5 Tensile Tester at a pull speed of 150 mm/min. The values of the maximum hot tack measured are collected in the following table:

| Composition | 12 | 24 |
|---|---|---|
| Hot tack in N/15 mm | 3.8 | 3 |

As can be seen from these results, the introduction of a copolymer of ethylene and butyl acrylate in a composition of a copolymer of propylene and ethylene increased the maximum hot tack of about 26%.

What is claimed is:

1. A sealant composition comprising:
    i) at least a copolymer of propylene and α-olefins, said copolymer having a melting point less than 155° C. when measured according to ASTM D 3418, and
    ii) at least a copolymer of ethylene and alkyl acrylate, wherein the alkyl acrylate is present in an amount ranging from about 1 to less than 9 weight percent, relative to the weight of the sealant composition.

2. The composition of claim 1, wherein the alkyl acrylate is present in an amount ranging from about 1 to about 6 weight percent, relative to the weight of the sealant composition.

3. The composition of claim 1, wherein the alkyl acrylate is selected from methyl acrylate and butyl acrylate.

4. The composition of claim 1, wherein the copolymer of propylene and α-olefins shows a melting point less than or equal to 148° C. measured according to ASTM D 3418.

5. The composition of claim 1, wherein the copolymer of propylene and α-olefins is selected from random copolymers of propylene and ethylene and terpolymers of propylene, ethylene and butene.

6. Multilayer film comprising at least one substrate layer and at least one sealant layer comprising
    i) at least a copolymer of propylene and α-olefins, and
    ii) at least a copolymer of ethylene and alkyl acrylate, wherein the alkyl acrylate is present in an amount ranging from about 1 to less than 9 weight precent, relative to the weight of the sealant composition.

7. Packaging comprising the sealant composition of claim 1.

8. The composition of claim 1, wherein the copolymer of propylene and α-olefins shows a melting point less than or equal to 140° C. measured according to ASTM D 3418.

* * * * *